United States Patent
Kaneiwa et al.

(10) Patent No.: US 9,531,228 B2
(45) Date of Patent: Dec. 27, 2016

(54) ELECTRIC ROTATING MACHINE

(71) Applicant: DENSO CORPORATION, Kariya, Aichi-pref. (JP)

(72) Inventors: Hiroshi Kaneiwa, Kariya (JP); Yuuichirou Itou, Anjo (JP)

(73) Assignee: DENSO CORPORATION, Kariya (JP)

(*) Notice: Subject to any disclaimer, the term of this patent is extended or adjusted under 35 U.S.C. 154(b) by 399 days.

(21) Appl. No.: 13/971,023

(22) Filed: Aug. 20, 2013

(65) Prior Publication Data
US 2014/0062248 A1    Mar. 6, 2014

(30) Foreign Application Priority Data
Aug. 30, 2012 (JP) ................... 2012-190550

(51) Int. Cl.
*H02K 3/12* (2006.01)
*H02K 3/32* (2006.01)
(Continued)

(52) U.S. Cl.
CPC ............... *H02K 3/345* (2013.01); *H02K 3/12* (2013.01); *H02K 3/32* (2013.01); *H02K 3/34* (2013.01);
(Continued)

(58) Field of Classification Search
CPC ...... H02K 3/345; H02K 3/12; H02K 2213/03; H02K 3/34; H02K 3/32; H02K 15/10; H02K 15/105; H02K 3/30; H02K 3/04; H02K 3/00; H02K 3/02; H01F 41/12; H01F 41/122; H01F 41/125; H01F 41/077
(Continued)

(56) References Cited

U.S. PATENT DOCUMENTS

| | | | |
|---|---|---|---|
| 5,955,804 A * | 9/1999 | Kusase et al. | 310/59 |
| 6,388,358 B1 * | 5/2002 | Umeda et al. | 310/201 |

(Continued)

FOREIGN PATENT DOCUMENTS

| | | | | |
|---|---|---|---|---|
| AT | EP 0981139 A1 * | 2/2000 | | H01B 9/006 |
| JP | 54039812 A * | 3/1979 | | |

(Continued)

OTHER PUBLICATIONS

JP2009123418 English Translation.*

(Continued)

*Primary Examiner* — Joshua Benitez-Rosario
*Assistant Examiner* — Alexander Moraza
(74) *Attorney, Agent, or Firm* — Nixon & Vanderhye P.C.

(57) ABSTRACT

The electric rotating machine has the structure in which, for each one of the slots formed in its stator core, each of the innermost and outermost electrical conductors housed in the slot includes a R-chamfered portion formed in a bent portion thereof projecting outside from the slot and bent along a circumferential direction of the stator core. The R-chamfered portion is located at a radially inner or outer corner of the bent portion at which a side surface of the bent portion on the side being circumferentially bent intersects with a side surface of the bent portion on the radially inner or outer side. The R-chamfered portion is formed of a curved surface having a curvature radius larger than a curvature radius of the other three corners of the bent portion.

1 Claim, 8 Drawing Sheets

(51) Int. Cl.
*H02K 3/34* (2006.01)
*H02K 3/04* (2006.01)
*H02K 3/00* (2006.01)
*H02K 15/10* (2006.01)
*H01F 41/12* (2006.01)

(52) U.S. Cl.
CPC ............... *H01F 41/12* (2013.01); *H02K 3/04* (2013.01); *H02K 2213/03* (2013.01)

(58) Field of Classification Search
USPC ........ 310/215, 179, 201, 208, 214, 194, 198
See application file for complete search history.

(56) References Cited

U.S. PATENT DOCUMENTS

| | | | |
|---|---|---|---|
| 6,404,092 B1* | 6/2002 | Baumann et al. | 310/201 |
| 2004/0172805 A1* | 9/2004 | Tokizawa | 29/596 |
| 2012/0161567 A1* | 6/2012 | Gorohata | H02K 15/0037 310/187 |

FOREIGN PATENT DOCUMENTS

| | | | |
|---|---|---|---|
| JP | 03277147 A | * | 12/1991 |
| JP | 3351387 | | 11/2002 |
| JP | 2005310566 A | * | 11/2005 |
| JP | 2009123418 A | * | 6/2009 |

OTHER PUBLICATIONS

JP2005310566 English Translation.*
JP 54039812 A (English Abstract).*
Ishizaka (JP 03277147) English Translation.*
Breuer et al. (EP 0981139) English Translation.*

* cited by examiner

ELECTRIC ROTATING MACHINE

This application claims priority to Japanese Patent Application No. 2012-190550 filed on Aug. 30, 2012, the entire contents of which are hereby incorporated by reference.

BACKGROUND OF THE INVENTION

1. Field of the Invention

The present invention relates to an electric rotating machine mounted on a vehicle or the like to be used as a motor or an alternator.

2. Description of Related Art

There is known an electric rotating machine with a stator including a stator core having an annular shape and formed with slots and a stator winding wound on the stator core such that a plurality of electrical conductors are radially arranged in each of the slots, an insulating sheet material being interposed between the electrical conductors and the inner wall of each of the slots. For example, refer to Japanese Patent No. 3351387.

This patent document describes folding an insulating sheet member into a shape of a square tube corresponding to the cross-sectional shape of the slot. The insulating sheet member can be folded into a shape of a square tube by pressing the edge of a blade to the surface of the insulating sheet member to form axially extending creases, and folding the insulating sheet member along the creases, for example. Each of the creases is formed so as to reach both the axial edges of the insulating sheet member. The insulating sheet member folded into the shape of a square tube is disposed such that the axial edge portions thereof project from the axial end surfaces of the stator core.

The above patent document also describes forming a cuff portion at each axial edge of the insulating sheet member to prevent the insulating sheet member from coming off from the slot.

The electric rotating machine described in the above patent document has coil ends located at both the axial ends of the stator core, at which the electrical conductors projecting outside from the axial end surfaces of the stator core are bent to form skew portions. Accordingly, the insulating sheet member is likely to be torn in its axial end portions, especially at their corners projecting outside from the axial end surfaces of the stator core, because of being pulled by the electrical conductors when they are bent. If such a tear occurs, it may develop inside of the slot, or the insulation creepage distance between the stator core and the stator winding may become insufficient, making it difficult to provide sufficient insulation.

SUMMARY

An exemplary embodiment provides an electric rotating machine including:
a rotor; and
a stator including a stator core disposed so as to radially face the rotor and formed with slits axially extending and circumferentially arranged, a stator winding constituted of electrical conductors having a rectangular cross section and wound in the slots such that a predetermined number of the slots are radially arranged in each of the slots, and an insulating sheet member folded into a shape of a square tube and disposed in each of the slots so as to be interposed between an inner wall of the slot and the electrical conductors housed in the slot,
wherein, for each of the slots, an innermost one of the predetermined number of the electrical conductors housed in each slot, which is disposed on the radially innermost side of the slot, includes one of a first R-chamfered portion and a first flat C-chamfered portion formed in a first bent portion thereof projecting outside from the slot and bent along a circumferential direction of the stator core, the first R-chamfered portion being located at a radially inner corner of the first bent portion at which aside surface of the first bent portion on the side being circumferentially bent intersects with aside surface of the first bent portion on the radially inner side, the first R-chamfered portion being formed of a curved surface having a curvature radius larger than a curvature radius of the other three corners of the first bent portion, and an outermost one of the predetermined number of the electrical conductors housed in the slot, which is disposed on a radially outermost side of the slot, includes one of a second R-chamfered portion and a second flat C-chamfered portion formed in a second bent portion thereof projecting outside from the slot and bent along the circumferential direction of the stator core, the second R-chamfered portion being located at a radially outer corner of the second bent portion at which a side surface of the second bent portion on the side being circumferentially bent intersects with a side surface of the second bent portion on the radially outer side, the second R-chamfered portion being formed of a curved surface having a curvature radius larger than a curvature radius of the other three corners of the second bent portion.

According to the exemplary embodiment, there is provided an electric rotating machine whose insulating sheet member disposed in each of the slots formed in its stator core is unlikely to be torn at its axial ends.

Other advantages and features of the invention will become apparent from the following description including the drawings and claims.

PREFERRED EMBODIMENTS OF THE INVENTION

First Embodiment

Figure 1:
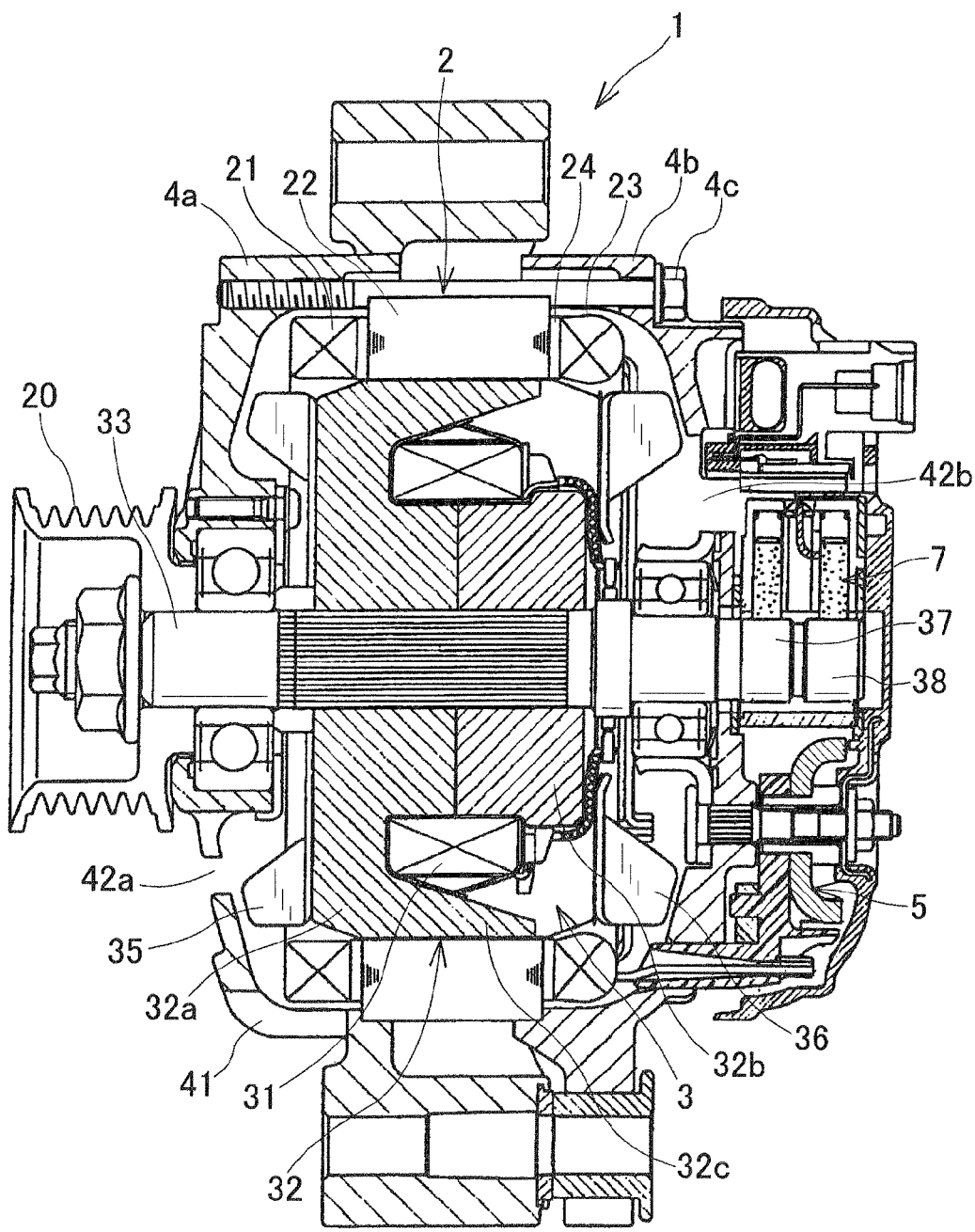
FIG. 1 is an axial cross-sectional view of an electric rotating machine according to a first embodiment of the invention.

FIG. 1 is an axial cross-sectional view of an electric rotating machine 1 according to a first embodiment of the invention. The electric rotating machine 1, which is used as a vehicle-use alternator, includes a stator 2 functioning as an armature, a rotor 3 functioning as a field device, front and rear housings 4a and 4b fastened to each other by fastening bolts 4c for housing therein the stator 2 and the rotor 3, and a rectifier 5 for rectifying AC power generated in the stator 2 to DC power.

Figure 2:
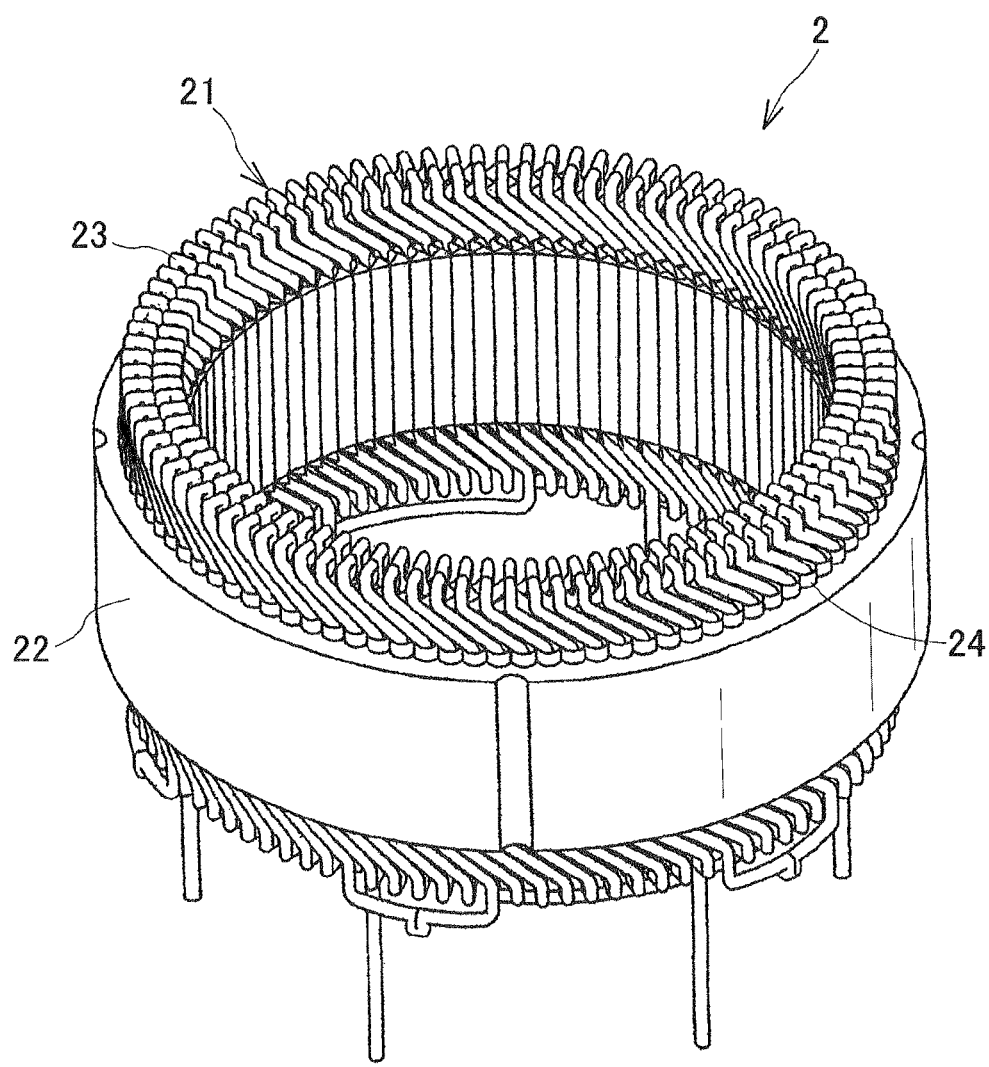
FIG. 2 is an entire perspective view of a stator of the electric rotating machine according to the first embodiment of the invention.

As shown in FIG. 2, the stator 2 includes a stator core 22, a segment-type multiphase stator winding 21 constituted of a plurality of conductor segments 23 and insulating sheet members 24 for providing electrical insulation between the stator core 22 and the stator winding 21. The stator 2 is held and fixed between the front and rear housings 4a and 4b so as to have an air gap G (see FIG. 5) with the outer periphery of the rotor 3.

As shown in FIG. 1, the rotor 3, which is configured to rotate together with a shaft 33 rotatably supported by the front and rear housings 4a and 4b, includes a Lundell-type pole core 32 and a field winding 31. A pulley 20 coupled to a vehicle driving engine (not shown) through a belt or the like is fixed to the front end of the shaft 33.

The Lundell-type pole core 32 is constituted of a pair of front and rear pole cores 32a and 32b. Each of the front and rear pole cores 32a and 32b includes 6 claw-shaped magnetic poles 32c. The front and rear pole cores 32a and 32b are fitted on the shaft 33 so as to sandwich therebetween the field winding 31 formed of an insulated copper wire wound concentrically in a cylindrical shape. In this embodiment, each of the pole cores 32a and 32b includes 8 magnetic poles. Accordingly, the rotor 3 includes 16 magnetic poles.

The axial front end surface of the front housing 4a is formed with air inlet holes 42a. The axial rear end surface of the rear housing 4b is formed with air inlet holes 42b. A mixed flow fan 35 is fixed to the front end surface of the pole core 32a by welding or the like to blow air sucked from the air inlet holes 42a as cooling air in the axial and radial directions. Likewise, a mixed flow fan 36 is fixed to the rear end surface of the pole core 32b by welding or the like to blow air sucked from the air inlet holes 42b as cooling air in the axial and radial directions. Each of the front and rear housings 4a and 4b is formed with air discharge holes 41 at positions facing the coil end portions of the stator winding 21, which project from both the axial ends of the stator core 22.

The shaft 33 is formed with slip rings 37 and 38 near the rear end thereof. The field coil 31 is applied with a field voltage from a brush device 7 through the slip rings 37 and 38.

The electric rotating machine 1 having the structure described above operates such that the rotor 3 rotates together with the shaft 33 in a predetermined direction when a rotational force is transmitted from the engine to the pulley 20 through a belt or the like. In this state, by causing the brush device 7 to apply the field voltage to the field coil 31 of the rotor 3 through the slip rings 37 and 38, the claw-shaped magnetic poles 32c of the pole cores 32a and 32b are excited to form N magnetic poles and S magnetic poles alternately along the circumferential direction of the rotor 3. As a result, a three-phase AC voltage is induced in the stator winding 21, and a DC current can be taken from the output terminal of the rectifier 5.

Next, the structure of the stator 2 is explained in detail with reference to FIGS. 2 to 9. The stator core 22 is formed by axially laminating electromagnetic steel plates having an annular shape. The stator core 22 includes an annular back core portion 22a forming the outer periphery thereof and a plurality of tooth portions 22b projecting radially inside from the back core portion 22a so as to be arranged at regular intervals along the circumferential direction. Between each adjacent two of the tooth portions 22b, a slot 25 having an approximately rectangular shape is formed to house the multiphase stator winding 21. In this embodiment, the slots 25 are located at 96 places along the circumferential direction to house two sets of the three-phase stator windings 21 corresponding to the 16 magnetic poles of the rotor 3.

The stator winding 21 mounted in the slots 25 of the stator core 22 is constituted of a plurality of U-shaped conductor segments 23 joined to one another at their joint ends 23f. The conductor segment 23 is formed of a flat square wire having a rectangular cross section, which includes a conductor portion 23j made of metal material such as copper and an insulating film 23k covering the surface of the conductor portion 23j.

Figure 3:
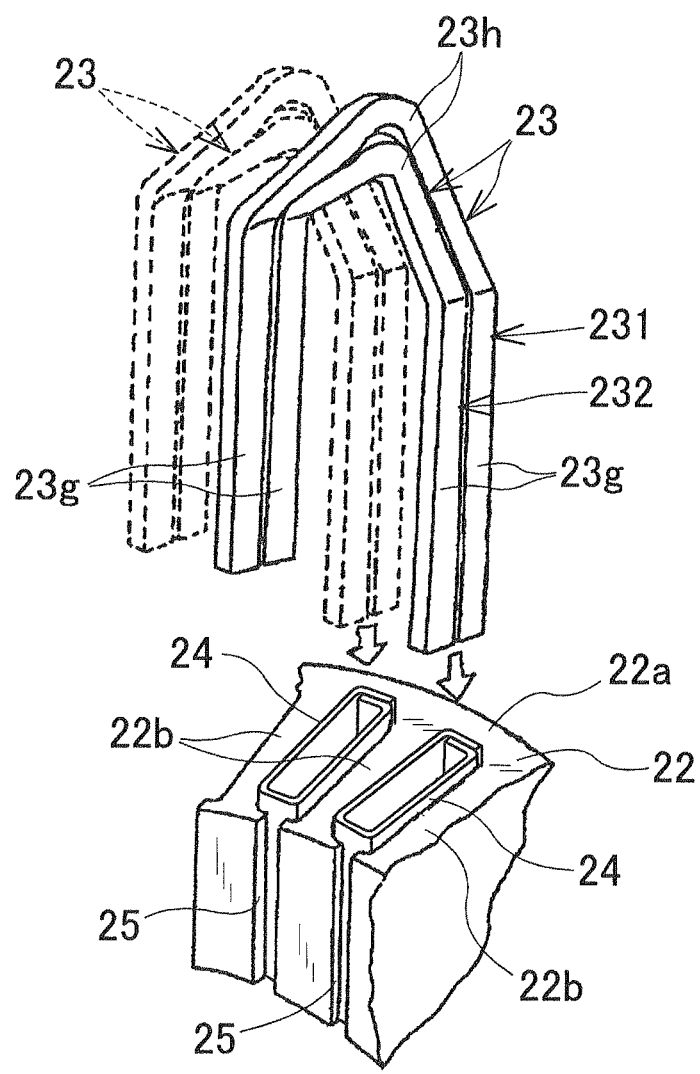
FIG. 3 is a diagram explaining how conductor segments are inserted into slots of a stator core of the stator of the electric rotating machine according to the first embodiment of the invention.
Figure 4:
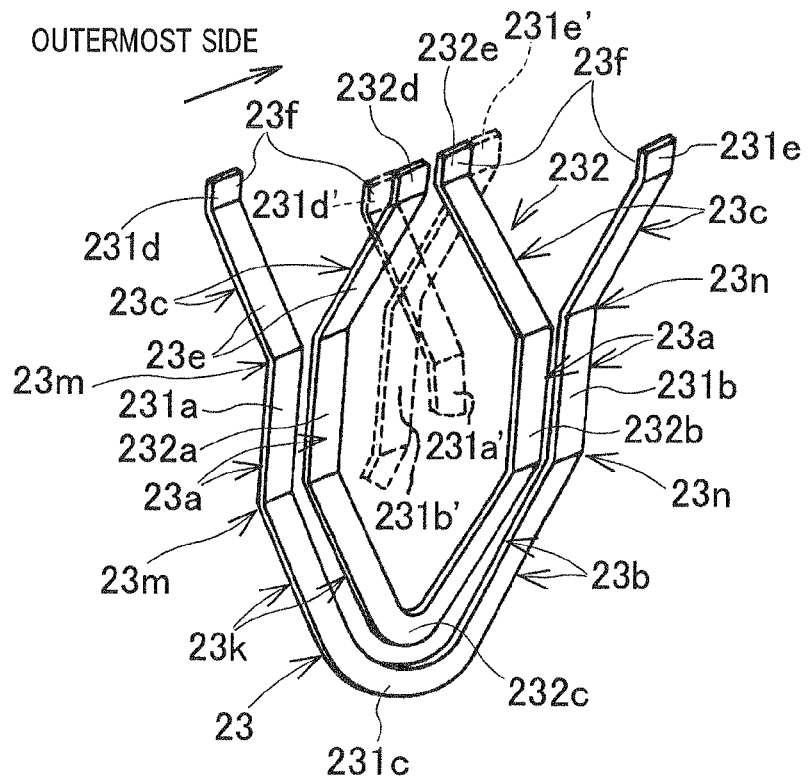
FIG. 4 is a schematic perspective view of the conductor segments for use in the electric rotating machine according to the first embodiment of the invention.

As shown in FIG. 3, the conductor segment 23 is U-shaped, and includes a pair of straight portions 23g and a turn portion 23h connecting the ends of these straight portions 23g. The pair of the straight portions 23g of each U-shaped conductor segment 23 are inserted into two of the slots 25 apart from each other by a predetermined slot pitch from one axial end side, and bent such that each of the open ends of the straight portions 23g extending outside on the other axial end side skews at a certain angle with respect to the circumferential direction.

Hence, the conductor segment 23 is constituted of a pair of in-slot portions 23a accommodated in the slots 25 and extending straight in the axial direction, and a coil end portion projecting from the slots 25 in the axial direction and extending in the circumferential direction. The coil end portion is constituted of a turn-side end portion 23b which connects one ends of the in-slot portions 23a and projects from the slots 25 from the one axial end side (the rear side of the electric rotating machine 1 or the right side in FIG. 1), and a pair of joint-side end portions 23c integrally connected to the other ends of the in-slot portions 23a and projecting from the slots 25 from the other axial end side (the front side of the electric rotating machine 1 or the left side in FIG. 1).

The turn-side end portion 23b includes a V-shaped turn portion 23h which is formed by bending. The joint-side end portion 23c includes a joint-side skew portion 23e formed by flexion so as to skew at a certain angle with respect to the axial end surface of the stator core 22, and a joint end 23f integral with the joint-side skew portion 23e, which is formed by flexion. The insulating film 23k is peeled off from the joint end 23f so that the inner conductor is exposed.

Figure 5:
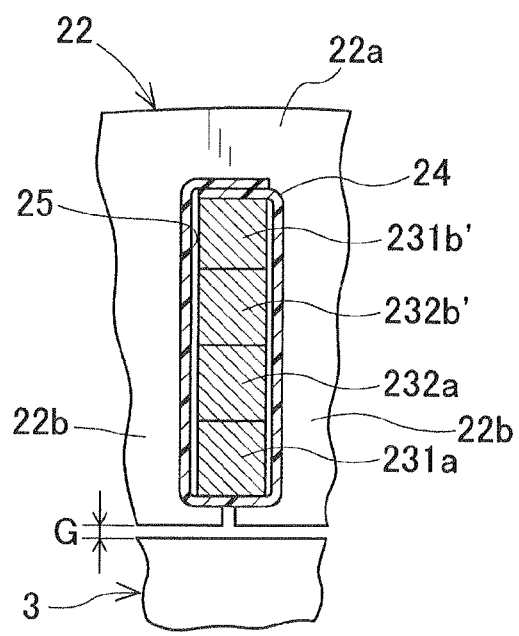
FIG. 5 is a partial cross-sectional view of the stator of the electric rotating machine according to the first embodiment of the invention.

Each of the slots 25 of the stator core 22 accommodates an even number of (four in this embodiment) the electrical conductors (the in-slot portions 23a of the conductor segments 23). As shown in FIG. 5, the four electrical conductors accommodated in each slot 25 are disposed at the innermost layer, the inner middle layer, the outer middle layer and the outermost layer respectively along the radial direction. These four electrical conductors accommodated in each slot 25 constitute a same one of the three phase windings of the three-phase stator winding 21.

In each slot 25, there is disposed the insulating sheet member 24 folded into a shape of a square tube corresponding to the cross-sectional shape of the slot 25. The axial length of the insulating sheet member 24 is slightly greater than that of the slot 25, so that both the axial ends of the insulating sheet member 24 slightly project from the slot 25 as shown in FIG. 3. The insulating sheet member 24 folded into the shape of a square tube is disposed such that its overlapping portion at which the circumferential end portions are overlapped with each other is located on the radially outer side of the slot 25. The insulating sheet member 24 disposed as described above provides electrical insulation between the four electrical conductors disposed in the slot 25 and the inner wall of the slot 25.

The electrical conductor 231a located at the innermost layer (may be referred to as the innermost electrical conductor 231a hereinafter) in each slot 25 (see FIGS. 4 and 5) includes a R-chamfered portion 27 formed in its bent portion 23m (see FIG. 4) projecting outside from the slot 25 and bent along the circumferential direction. The R-chamfered portion 27 is located at the inner corner A1 of the bent portion 23m at which the side surface of the bent portion 23m on the side being circumferentially bent (on the side at which bent portion 23m makes an acute angle with the axial end surface of the stator core 22) intersects with the side surface of the bent portion 23m on the radially inner side. The R-chamfered portion 27 is formed of a curved surface having a curvature radius R2 larger than the curvature radius R1 of the other three corners.

Figure 6A:
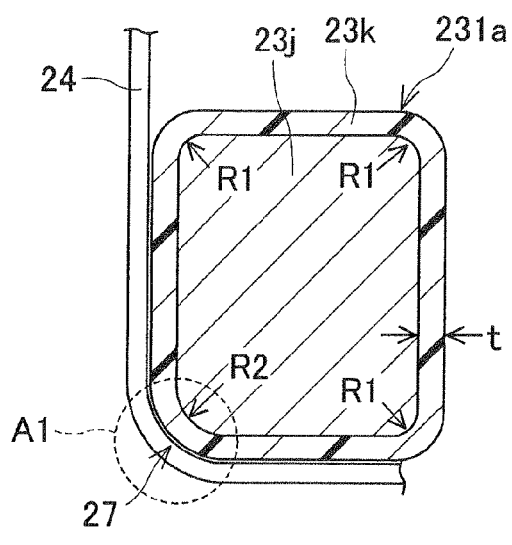
FIG. 6A is a cross-sectional view of a bent portion of a joint-side end portion of an electrical conductor disposed on the radially innermost side in each slot of the stator of the electric rotating machine according to the first embodiment of the invention as viewed from the joint-side end portion.

That is, as shown in FIG. 6A, the bent portion 23m of the innermost electrical conductor 231a is formed with the R-chamfered portion 27 at the inner corner A1 (at the lower left of FIG. 6A) on the side of the joint-side end portion 23c. The thickness t of the insulating film 23k is approximately even throughout the circumferential direction. The R-chamfered portion 27 is formed by making the curvature radius R2 of the conductor portion 23j at the inner corner A1 larger than the curvature radius R1 of the conductor portion 23j at the other three corners. The curved surfaces having the curvature radius R1 at the other three corners may be formed unintentionally or intentionally.

Figure 6B:
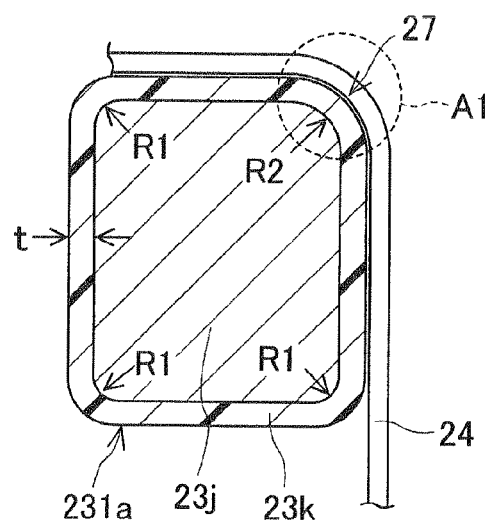
FIG. 6B is a cross-sectional view of a bent portion of a turn-side end portion of the electrical conductor disposed on the radially innermost side in each slot of the stator of the electric rotating machine according to the first embodiment as viewed from the turn-side end portion.

As shown in FIG. 6B, the bent portion 23m of the innermost electrical conductor 231a is formed with the R-chamfered portion 27 at the inner corner A1 (at the upper right in FIG. 6B) also on the side of the turn-side end portion 23b. Like the foregoing, the thickness t of the insulating film 23k is approximately even throughout the circumferential direction, and the R-chamfered portion 27 is formed by making the curvature radius R2 of the conductor portion 23j at the inner corner A1 larger than the curvature radius R1 of the conductor portion 23j at the other three corners.

The provision of the R-chamfered portion 27 formed by making the curvature radius R2 at the inner corner A1 larger than the curvature radius R1 at the other three corners makes it possible to prevent the insulating sheet member 24 from being torn, because it is possible to reduce the pressing force applied to the folded corner portion of the insulating sheet member 24 when the inner corner A1 of the bent portion 23m abuts against the folded corner of the axial end surface of the insulating sheet member 24.

Also the electrical conductor 231b located at the outermost layer (may be referred to as the outermost electrical conductor 231b hereinafter) in each slot 25 (see FIGS. 4 and 5) includes the R-chamfered portion 27 formed in its bent portion 23n (see FIG. 4) projecting outside from the slot 25 and bent along the circumferential direction. The R-chamfered portion 27 is located at the outer corner B1 at which the side surface of the bent portion 23n on the side being circumferentially bent (on the side at which the bent portion 23n makes an acute angle with the axial end surface of the stator core 22) intersects with the side surface of the bent portion 23n on the radially outer side. The R-chamfered portion 27 is formed of a curved surface having the curvature radius R2 larger than the curvature radius R1 of the other three corners.

Figure 7A:
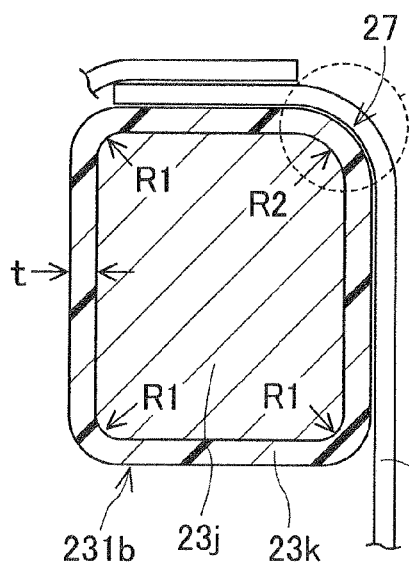
FIG. 7A is a cross-sectional view of a bent portion of a joint-side end portion of an electrical conductor disposed on the radially outermost side in each slot of the stator of the electric rotating machine according to the first embodiment of the invention as viewed from the joint-side end portion.

That is, as shown in FIG. 7A, the bent portion 23n of the outermost electrical conductor 231a is formed with the R-chamfered portion 27 at the outer corner B1 (at the upper right of FIG. 7A) on the side of the joint-side portion 23c.

The thickness t to of the insulating film 23k is approximately even throughout the circumferential direction. The R-chamfered portion 27 is formed by making the curvature radius R2 of the conductor portion 23j at the outer corner B1 larger than the curvature radius R1 of the conductor portion 23j at the other three corners.

Figure 7B:
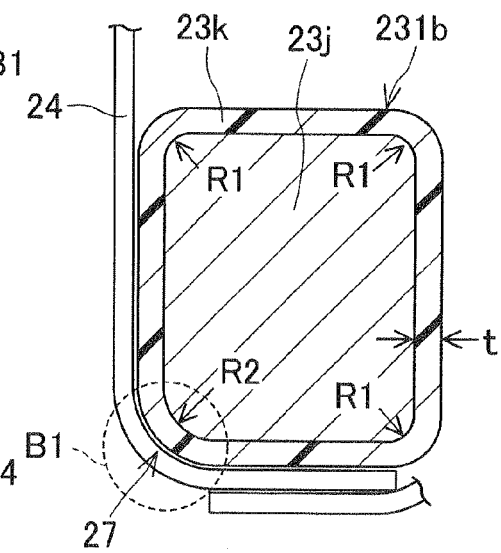
FIG. 7B is a cross-sectional view of a bent portion of a turn-side end portion of the electrical conductor disposed on the radially outermost side in each slot of the electric rotating machine according to the first embodiment of the invention as viewed from the turn-side end portion.
Figure 8:
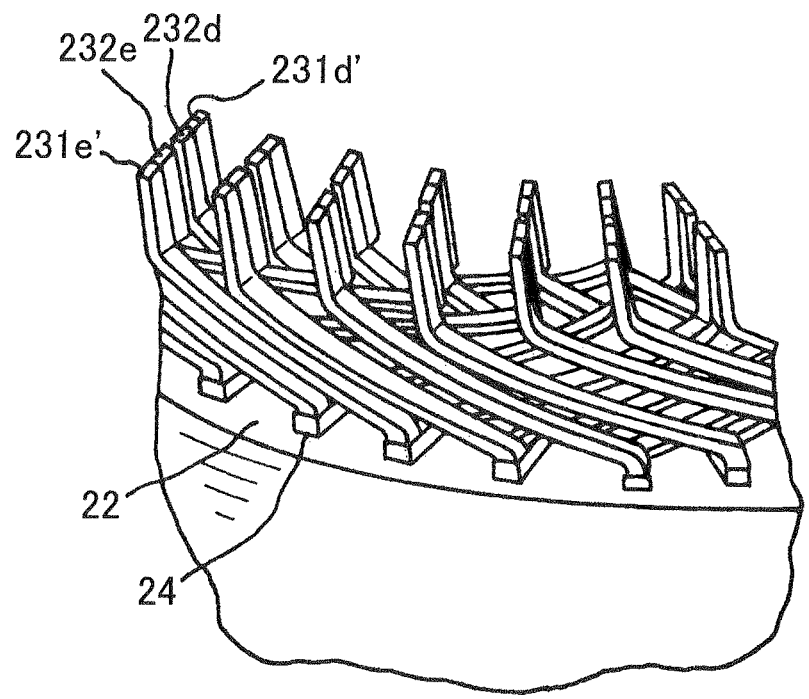
FIG. 8 is a perspective view showing part of joint-side end portions of the stator of the electric rotating machine according to the first embodiment of the invention.

As shown in FIG. 7B, the bent portion 23n of the outermost electrical conductor 231b is formed with the R-chamfered portion 27 at the outer corner B1 (at the lower left in FIG. 7B) also on the side of the turn-side end portion 23b. Like the foregoing, the thickness t of the insulating film 23k is approximately even throughout the circumferential direction, and the R-chamfered portion 27 is formed by making the curvature radius R2 of the conductor portion 23j at the outer corner B1 larger than the curvature radius R1 of the conductor portion 23j at the other three corners.

The provision of the R-chamfered portion 27 formed by making the curvature radius R2 at the outer corner B1 larger than the curvature radius R1 at the other three corners makes it possible to prevent the insulating sheet member 24 from being torn, because it is possible to reduce the pressing force applied to the folded corner portion of the insulating sheet member 24 when the outer corner B1 of the bent portion 23n abuts against the folded corner of the axial end of the insulating sheet member 24.

The electrical conductors housed in each of the slots 25 are electrically connected to one another in a predetermined pattern to form the stator winding 21. In this embodiment, the electrical connection on the side of the turn-side end portions 23b of the electrical conductors housed in each slot 25 is made through the turn portions 23h located on the one axial end side, and made by joining corresponding two of the joint ends 23f to each other by arc welding or the like on the other axial end side. That is, the plurality of the turn portions 23h projecting from the slots 25 on the one axial end side of the stator core 22 form a first coil end group, and the plurality of the joint-side end portions 23c projecting from the slots 25 on the other axial end side of the stator core 22 form a second coil end group (see FIG. 8).

Each one of the electrical conductors housed in each one of the slots 25 is paired with one of the electrical conductors housed in another one of the slots distant from this each one of the slots 25 by a predetermined magnetic pole pitch.

Figure 9:
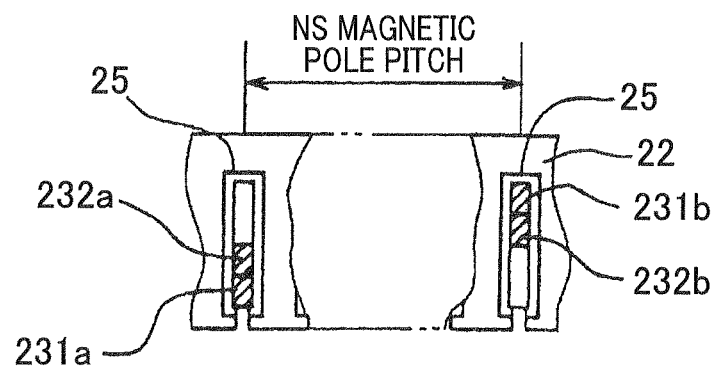
FIG. 9 is a partial cross-sectional view of the stator of the electric rotating machine according to the first embodiment of the invention.

For example, as shown in FIG. 9, the innermost electrical conductor 231a of each one of the slots 25 is paired with the electrical conductor 231b of a different one of the slots 25 distant from this each one of the slots 25 by one magnetic pole pitch (one NS magnetic pole pitch) in the clockwise direction of the stator core 22. Likewise, the inner middle electrical conductor 232a of each one of the slots 25 is paired with the outer middle electrical conductor 232b of a different one of the slots 25 distant from this each one of the slots 25 by one magnetic pole pitch in the clockwise direction of the stator core 22. The innermost electrical conductor 231a and the outermost electrical conductor 231b paired with each other are connected to each other through the turn portion 23h (231c) at the turn-side end portion 23b on the one axial end side of the stator core 22, while the inner middle electrical conductor 232a and the outer middle electrical conductor 232b are connected to each other through the turn portion 23h (232c).

Accordingly, on the one axial end side of the stator core 22, the turn portion 23h (232c) connecting the inner middle electrical conductor 232a and the outer middle electrical conductor 232b is surrounded by the turn portion 23h (231c) connecting the innermost electrical layer 231a and the outermost electrical conductor 231b. As explained above, on the one axial end side of the stator core 22, one turn portion 23h (232c) as a connecting portion for connecting one paired electrical conductors is surrounded by the other turn portion 23h (231c) as a connecting portion for connecting the other paired electrical conductors housed in the same slot 25. The turn portion 23h (232c) connecting the inner middle electrical conductor 232a and the outer middle electrical conductor 232b forms a middle layer coil end, and the turn portion 23h (231c) connecting the innermost electrical conductor 231a and the outermost electrical conductor 231b forms an end layer coil end.

On the other hand, the inner middle electrical conductor 232a of each one of the slots 25 is paired also with the innermost electrical conductor 231a' of a different one of the slots 25 distant from this each one of the slots 25 by one magnetic pole pitch in the clockwise direction of the stator core 22. Likewise, the outermost electrical conductor 231b' of each one of the slots 25 is paired also with the outer middle electrical conductor 232b of a different one of the slots 25 distant from this each one of the slots 25 by one magnetic pole pitch of the stator core 22 in the clockwise direction. The inner middle electrical conductor 232a and the innermost electrical conductor 231a' paired with each other at the joint-side end portion 23c on the other axial end side of the stator core 22 are connected to each other through joint between the joint ends 23f (232d and 231d'). The outermost electrical conductor 231b' and the outer middle electrical conductor 232b are connected to each other through a joint between the joint ends 23f (231e' and 232e).

Accordingly, on the other axial end side of the stator core 22, an inner junction which is constituted of joint ends 232d and 231d' and connects the inner middle electrical conductor 232a and the innermost electrical conductor 231a' and an outer junction which is constituted of joint ends 231e' and 232e and connects the outermost electrical conductor 231b' and the outer middle electrical conductor 232b are located at positions deviated from each other in the radial and circumferential directions. Further, an inner junction which is constituted of joint ends 232d and 231d' and connects the inner middle electrical conductor 232a and the innermost electrical conductor 231a' and an outer junction which is constituted of joint ends 231e' and 232e and connects the outermost electrical conductor 231b' and the outer middle electrical conductor 232b form two radially adjacent coil ends located on two concentric circles, respectively.

Although not shown in the drawings, conductor exposed portions 23i of the outer and inner junctions and their vicinities are coated with insulating resin material for providing electrical insulation therebetween.

As shown in FIG. 3, the innermost electrical conductor 231a and the outermost electrical conductor 231b are implemented as a large segment 231 formed by shaping a conductor into a U-shape. Likewise, the inner middle electrical conductor 232a and the outer middle electrical conductor 232b are implemented as a small segment 232 formed by shaping a conductor into a U-shape. The large segment 231 and the small segment 232 constitute the U-shaped conductor segment 23 as a base conductor segment.

For each of the phase windings of the stator winding 21, a coil (winding) wound two turns around the stator core 22 is constituted of the base conductor segments 23. However, a segment integrally formed with an output lead and a neutral lead and a segment whose turn portion 23h is for connecting the first and second turns of the coil are formed as deformed segments. The coil ends of the respective phase windings of the stator winding 21 are star-connected using these deformed segments.

As described above, the electric rotating machine 1 according to the first embodiment of the invention has the structure in which the innermost electrical conductor 231a in each slot 25 includes the R-chamfered portion 27 located at the inner corner A1 of the bent portion 23m which projects outside from the slot 25 and bent in the circumferential direction, the R-chamfered portion 27 being constituted of a curved surface whose curvature radius R2 is larger than the curvature radius R1 of the other three corners. This structure makes it possible to prevent the insulating sheet member 24 from being torn, because the pressing force applied to the folded corner portion of the insulating sheet member 24 when the inner corner A1 of the bent portion 23m abuts against the folded corner of the axial end of the insulating sheet member 24 is lessened.

Further, according to this structure, the outermost electrical conductor 231b in each slot 25 includes the R-chamfered portion 27 located at the outer corner B1 of the bent portion 23n which projects outside from the slot 25 and bent in the circumferential direction, the R-chamfered portion 27 being constituted of a curved surface whose curvature radius R2 is larger than the curvature radius R1 of the other three corners. Accordingly, this structure makes it possible to prevent the insulating sheet member 24 from being torn, because the pressing force applied to the folded corner portion of the insulating sheet member 24 when the outer corner B1 of the bent portion 23n abuts against the folded corner of the axial end of the insulating sheet member 24 is lessened.

Hence, according to the first embodiment of the invention, it is possible to prevent the insulating sheet member 24 disposed in each slot 25 of the stator core 22 from being torn at either axial end thereof. Particularly, in the first embodiment, since the R-chamfered portion 27 is formed in the inner corner A1 of the electrical conductor 231a and the outer corner B1 of the electrical conductor 231b, the effect of the tear prevention is reliable compared to a case where a flat chamfered portion is provided instead of the R-chamfered portion.

Second Embodiment

Next, an electric rotating machine according to a second embodiment of the invention is described. The second embodiment differs from the first embodiment only in the shape of the R-chamfered portion provided in the innermost and outermost electrical conductors 231a and 231b housed in each slot 25. Accordingly, the second embodiment is described with a focus on the difference with the first embodiment with reference to FIGS. 10 and 11. In FIGS. 10 and 11, components or members which are the same as those shown in the previously described figures are given the same reference numerals or characters.

In the second embodiment, the innermost electrical conductor 231a in each slot 25 includes a R-chamfered portion 127 formed in its bent portion 23m projecting outside from the slot 25 and bent along the circumferential direction. The R-chamfered portion 127 is located at the inner corner A1 at which the side surface of the bent portion 23m on the side being circumferentially bent (on the side at which the bent portion 23m makes an acute angle with the axial end surface of the stator core 22) intersects with the side surface of the bent portion 23m on the radially inner side. The R-chamfered portion 127 is formed of a curved surface having the curvature radius R3 larger than the curvature radius R4 of the other three corners.

Figure 10A:
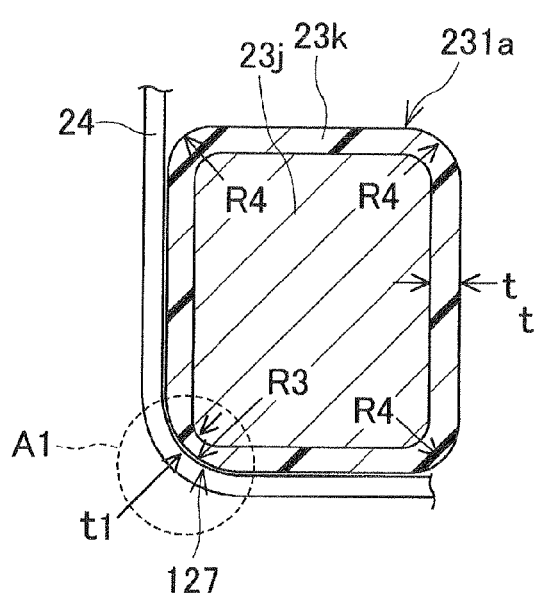
FIG. 10A is a cross-sectional view of a bent portion of a joint-side end portion of an electrical conductor disposed on the radially innermost side in each slot of a stator of an electric rotating machine according to a second embodiment of the invention as viewed from the joint-side end portion.

That is, as shown in FIG. 10A, the bent portion 23m of the joint-side end portion 23c of the innermost electrical conductor 231a is formed with the R-chamfered portion 127 at the inner corner A1 (at the lower left of FIG. 10A). The four corners of the conductor portion 23j are formed of curved surfaces having the same curvature radius R. The thickness of the insulating film 23k is t1 at the inner corner A1, and t at the other three corners, t1 being smaller than t. That is, the curvature radius R3 of the outer peripheral surface of the insulating film 23k at the inner corner A1 is larger than the curvature radius R4 of the outer peripheral surface of the insulating film 23k at the other three corners. In this way, the inner corner A1 is formed with the R-chamfered portion 127 formed of a curved surface whose curvature radius R3 is larger than the curvature radius R4 of the other three corners.

Figure 10B:
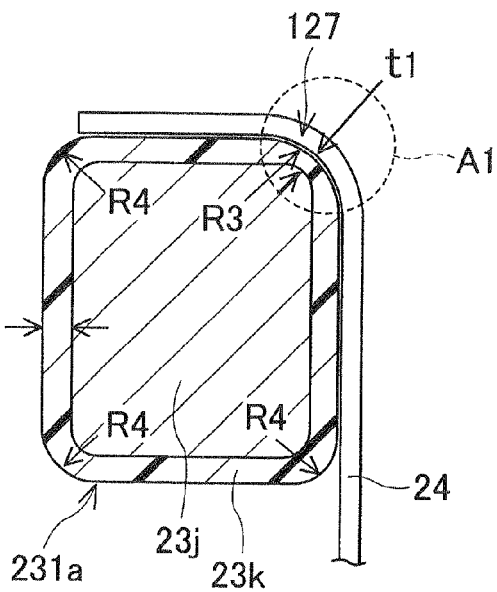
FIG. 10B is a cross-sectional view of a bent portion of a turn-side end portion of the electrical conductor disposed on the radially innermost side in each slot of the electric rotating machine according to the second embodiment of the invention as viewed from the turn-side end portion.

Further, as shown in FIG. 10B, the bent portion 23m of the turn-side bent portion 23b of the innermost electrical conductor 231a is formed with the R-chamfered portion 127 at the inner corner A1 (at the upper right in FIG. 10B) also on the side of the turn-side end portion 23b. Also the four corners of the conductor portion 23j on the turn side are formed of curved surfaces having the same curvature radius R. The thickness of the insulating film 23k is t1 at the inner corner A1, and t at the other three corners, t1 being smaller than t. That is, the curvature radius R3 of the outer peripheral surface of the insulating film 23k at the inner corner A1 is larger than the curvature radius R4 at the outer peripheral surface of the insulating film 23k at the other three corners. In this way, the inner corner A1 is formed with the R-chamfered portion 127 formed of a curved surface whose curvature radius R3 is larger than the curvature radius R4 of the other three corners.

The provision of the R-chamfered portion 127 formed by making the curvature radius R3 at the inner corner A1 larger than the curvature radius at the other three corners makes it possible to prevent the insulating sheet member 24 from being torn, because it is possible to reduce the pressing force applied to the folded corner portion of the insulating sheet member 24 when the inner corner A1 of the bent portion 23m abuts against the folded corner of the axial end of the insulating sheet member 24.

Figure 11A:
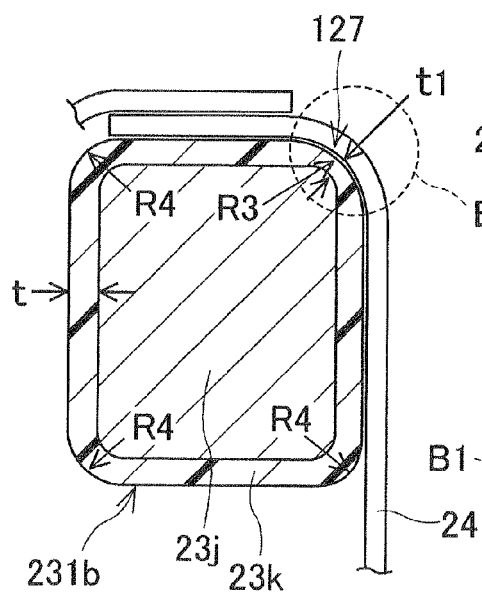
FIG. 11A is a cross-sectional view of a bent portion of a joint-side end portion of an electrical conductor disposed on the radially outermost side in each slot of the stator of the electric rotating machine according to the second embodiment of the invention as viewed from the joint-side end portion.

On the other hand, as shown in FIG. 11A, the bent portion 23n of the joint-side end portion 23c of the outermost electrical conductor 231b is formed with the R-chamfered portion 127 at the outer corner B1 (at the upper right of FIG. 11A). The four corners of the conductor portion 23j are formed of curved surfaces having the same curvature radius R. The thickness of the insulating film 23k is t1 at the inner corner A1, and t at the other three corners, t1 being smaller than t. That is, the curvature radius R3 of the outer peripheral surface of the insulating film 23k at the outer corner B1 is larger than the curvature radius R4 of the outer peripheral surface of the insulating film 23k at the other three corners. In this way, the outer corner B1 is formed with the R-chamfered portion 127 formed of a curved surface whose curvature radius R3 is larger than the curvature radius R4 of the other three corners.

Figure 11B:
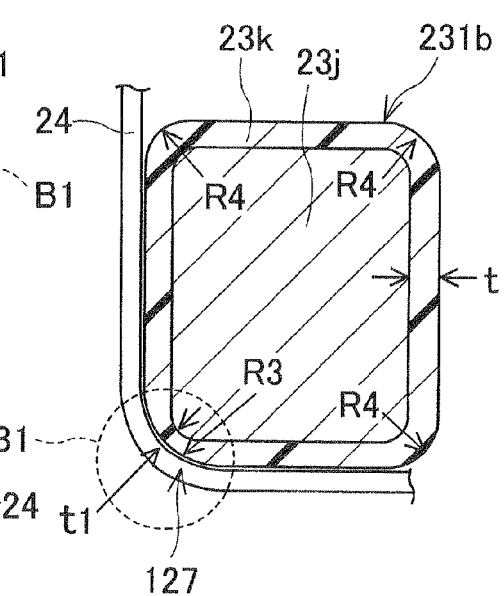
FIG. 11B is a cross-sectional view of a bent portion of a turn-side end portion of the electrical conductor disposed on the radially outermost side in each slot of the electric rotating machine according to the second embodiment of the invention as viewed from the turn-side end portion.

Further, as shown in FIG. 11B, the bent portion 23n of the turn-side end portion 23b of the outermost electrical conductor 231b is formed with the R-chamfered portion 127 at the outer corner B1 (at the lower left in FIG. 11B) also on the side of the turn-side end portion 23b. Like the foregoing, the four corners of the conductor portion 23j are formed of curved surfaces having the same curvature radius R. The thickness of the insulating film 23k is t1 at the outer corner B1, and t at the other three corners, t1 being smaller than t. That is, the curvature radius R3 of the outer peripheral surface of the insulating film 23k at the outer corner B1 is larger than the curvature radius R4 of the outer peripheral surface of the insulating film 23k at the other three corners. In this way, the outer corner B1 is formed with the R-chamfered portion 127 formed of a curved surface whose curvature radius R3 is larger than the curvature radius R4 of the other three corners.

The provision of the R-chamfered portion 127 formed by making the curvature radius R3 at the outer corner B1 larger than the curvature radius at the other three corners makes it possible to prevent the insulating sheet member 24 from being torn, because it is possible to reduce the pressing force applied to the folded corner portion of the insulating sheet member 24 when the outer corner B1 of the bent portion 23n abuts against the folded corner of the axial end of the insulating sheet member 24.

As described above, the electric rotating machine 2 according to the second embodiment of the invention has the structure in which the innermost electrical conductor 231a in each slot 25 includes the R-chamfered portion 127 located at the inner corner A1 of the bent portion 23m which projects outside from the slot 25 and bent in the circumferential direction, the R-chamfered portion 127 portion being constituted of a curved surface whose curvature radius R3 is larger than the curvature radius R4 of the other three corners. Further, according to this structure, the outermost electrical conductor 231b in each slot 25 includes the R-chamfered portion 127 located at the outer corner B1 of the bent portion 23n which projects outside from the slot 25 and bent in the circumferential direction, the R-chamfered portion 127 portion being constituted of a curved surface whose curvature radius R3 is larger than the curvature radius R4 of the other three corners.

Hence, according to the second embodiment of the invention, it is possible to prevent the insulating sheet member 24 disposed in each slot 25 of the stator core 22 from being torn at either axial end thereof.

Third Embodiment

The third embodiment differs from the first embodiment only in the shape of the R-chamfered portion provided in the innermost and outermost electrical conductors 231a and 231b housed in each slot 25. Accordingly, the third embodiment is described with a focus on the difference with the first embodiment with reference to FIGS. 12 and 13. In FIGS. 12 and 13, components or members which are the same as those shown in the previously described figures are given the same reference numerals or characters.

In the third embodiment, the innermost electrical conductor 231a in each slot 25 includes a flat C-chamfered portion 28 formed in its bent portion 23m projecting outside from the slot 25 and bent along the circumferential direction. The C-chamfered portion 28 is located at the inner corner A1 at which the side surface of the bent portion 23m on the side being circumferentially bent (on the side at which the bent portion 23m makes an acute angle with the axial end surface of the stator core 22) intersects with the side surface of the bent portion 23m on the radially inner side.

Figure 12A:
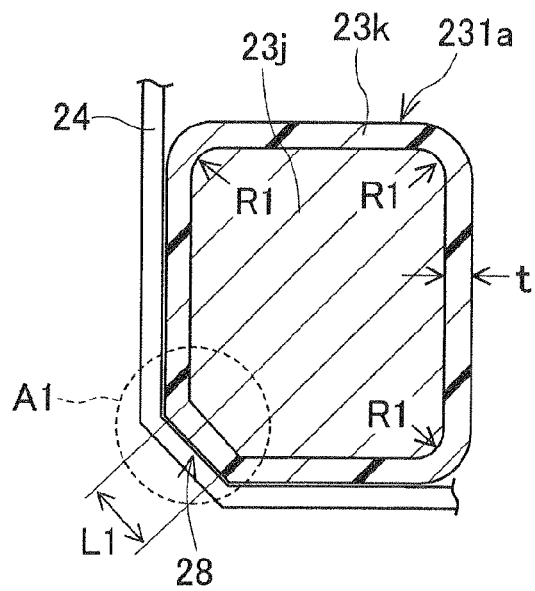
FIG. 12A is a cross-sectional view of a bent portion of a joint-side end portion of an electrical conductor disposed on the radially innermost side in each slot of a stator of an electric rotating machine according to a third embodiment of the invention as viewed from the joint-side end portion.

That is, as shown in FIG. 12A, the joint-side bent portion 23c of the innermost electrical conductor 231a is formed with the C-chamfered portion 28 at the inner corner A1 located at the lower left of FIG. 12A. The thickness t to of the insulating film 23k is approximately even throughout the circumferential direction. The length L1 of the C-chamfered portion 28 in cross section of FIG. 12A is greater than the length of the straight line connecting both ends of the arcuate curve at each of the other three corners.

Figure 12B:
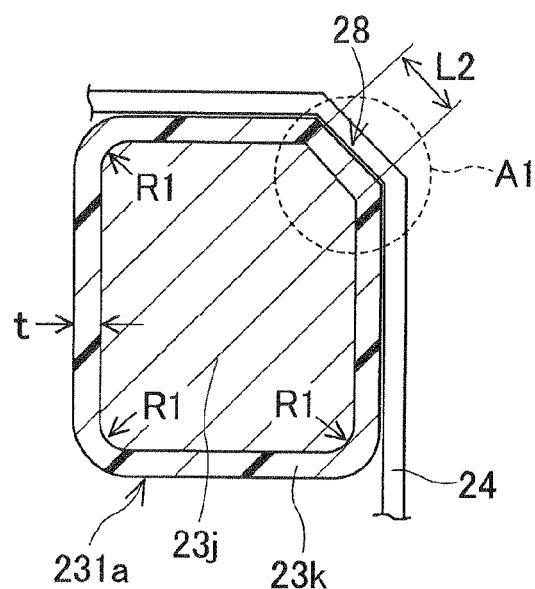
FIG. 12B is a cross-sectional view of a bent portion of a turn-side end portion of the electrical conductor disposed on the radially innermost side in each slot of the electric rotating machine according to the third embodiment of the invention as viewed from the turn-side end portion.

Further, as shown in FIG. 12B, the bent portion 23m of the turn-side end portion 23b of the innermost electrical conductor 231a is formed with the C-chamfered portion 127 at the inner corner A1 (at the upper right in FIG. 12B) also on the side of the turn-side end portion 23b. The thickness t of the insulating film 23k is approximately even throughout the circumferential direction. The length L2 of the C-chamfered portion 28 in cross section of FIG. 12B is greater than the length of the straight line connecting both ends of the arcuate curve at each of the other three corners.

The provision of the C-chamfered portion 28 at the inner corner A1 makes it possible to prevent the insulating sheet member 24 from being torn, because it is possible to reduce the pressing force applied to the folded corner portion of the insulating sheet member 24 when the inner corner A1 of the bent portion 23m abuts against the folded corner of the axial end of the insulating sheet member 24.

Figure 13A:
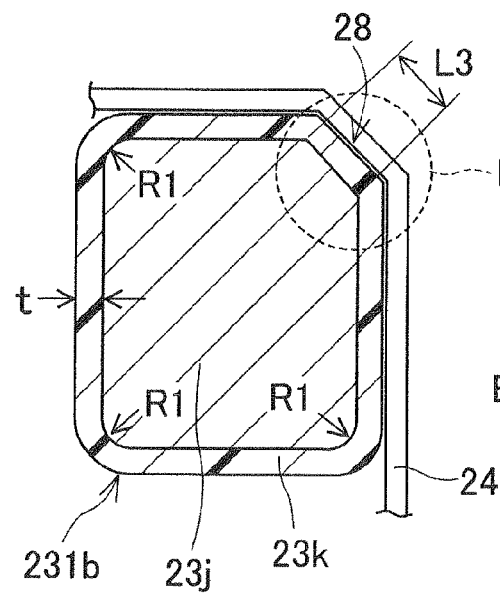
FIG. 13A is a cross-sectional view of a bent portion of a joint-side end portion of an electrical conductor disposed on the radially outermost side in each slot of the stator of the electric rotating machine according to the third embodiment of the invention as viewed from the joint-side end portion.

Further, as shown in FIG. 13A, the bent portion 23n of the joint-side end portion 23c of the outermost electrical conductor 231b is formed with the C-chamfered portion 28 at the outer corner B1 (at the upper right of FIG. 13A). The thickness t of the insulating film 23k is approximately even throughout the circumferential direction. The length L3 of the C-chamfered portion 28 in cross section of FIG. 13A is greater than the length of the straight line connecting both ends of the arcuate curve at each of the other three corners.

Figure 13B:
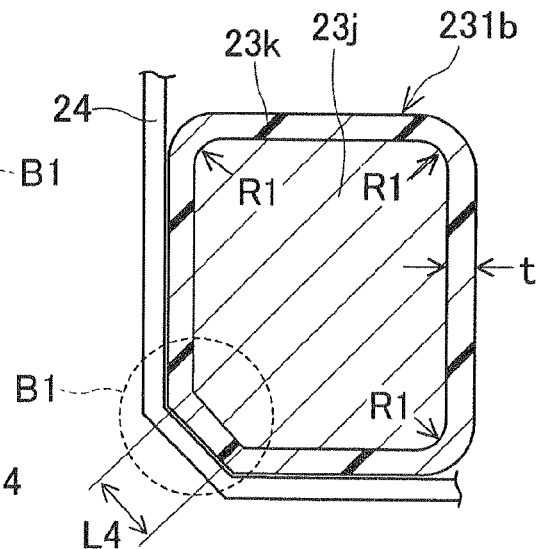
FIG. 13B is a cross-sectional view of a bent portion of a turn-side end portion of the electrical conductor disposed on the radially outermost side in each slot of the electric rotating machine according to the third embodiment of the invention as viewed from the turn-side end portion.

Further, as shown in FIG. 13B, the bent portion 23n of the turn-side end portion 23b of the outermost electrical conductor 231b is formed with the C-chamfered portion 28 at the outer corner B1 (at the lower left in FIG. 13B) also on the side of the turn-side end portion 23b. The thickness t of the insulating film 23k is approximately even throughout the circumferential direction. The length L4 of the C-chamfered portion 28 in cross section of FIG. 13B is greater than the length of the straight line connecting both ends of the arcuate curve at each of the other three corners.

The provision of the C-chamfered portion 28 at the outer corner B1 makes it possible to prevent the insulating sheet member 24 from being torn, because it is possible to reduce the pressing force applied to the folded corner portion of the insulating sheet member 24 when the outer corner B1 of the bent portion 23n abuts against the folded corner of the axial end of the insulating sheet member 24.

In the third embodiment, the innermost electrical conductor 231a in each slot 25 includes the flat C-chamfered portion 28 formed in its bent portion 23m projecting outside from the slot 25 and bent along the circumferential direction, and the outermost electrical conductor 231b in each slot 25 includes the flat C-chamfered portion 28 formed in its bent portion 23n projecting outside from the slot 25 and bent along the circumferential direction.

Hence, according to the third embodiment described above, it is possible to prevent the insulating sheet member 24 disposed in each slot 25 from being torn at either axial end thereof. The third embodiment is advantageous in manufacturing cost compared to the first embodiment, because the C-chamfered portions 28 can be formed easily compared to the R-chamfered portions 27.

Other Embodiments

It is a matter of course that various modifications can be made to the above described embodiments as described below.

In the above embodiments, the stator winding 22 has the four-layer structure in which four electrical conductors are radially arranged in each slot formed in the stator core. However, the number of the layers of the electrical conductors may be any even number.

The conductor segments 23 constituting the stator winding 22 are U-shaped. However, the conductor segments 23 may be I-shaped.

In the above embodiments, the stator winding 22 is constituted by joining the conductor segments 23. However, the stator winding 22 may be constituted of continuous conductors.

In the above embodiments, the conductors constituting the stator winding 22 are flat square wires having a rectangular cross section. However, they may be round wires having a circular cross section or an elliptic cross section.

The above embodiments are examples where the present invention is applied to vehicle-use AC alternators. However, the present invention is applicable to a stator of a motor or a vehicle-use electric rotating machine which can be used as both an alternator and a motor.

The above explained preferred embodiments are exemplary of the invention of the present application which is described solely by the claims appended below. It should be understood that modifications of the preferred embodiments may be made as would occur to one of skill in the art.

What is claimed is:

1. An electric rotating machine comprising: a rotor; and a stator including a stator core disposed so as to radially face the rotor and formed with slits axially extending and circumferentially arranged, a stator winding constituted of electrical conductors having a rectangular cross section and wound in the slots such that a predetermined number of the conductors are radially arranged in each of the slots, and an insulating sheet member folded into a shape of a square tube and disposed in each of the slots so as to be interposed between an inner wall of the slot and the electrical conductors housed in the slot, wherein, for each of the slots, an innermost one of the predetermined number of the electrical conductors housed in each slot, which is disposed on the radially innermost side of the slot, includes one of a first R-chamfered portion and a first flat C-chamfered portion formed in a first bent portion thereof projecting outside from the slot and bent along a circumferential direction of the stator core, the first R-chamfered portion being located at a radially inner corner of the first bent portion at which a side surface of the first bent portion on the side being circumferentially bent intersects with a side surface of the first bent portion on the radially inner side, the first R-chamfered portion being formed of a curved surface having a curvature radius larger than a curvature radius of the other three corners of the first bent portion, and an outermost one of the predetermined number of the electrical conductors housed in the slot, which is disposed on a radially outermost side of the slot, includes one of a second R-chamfered portion and a second flat C-chamfered portion formed in a second bent portion thereof projecting outside from the slot and bent along the circumferential direction of the stator core, the second R-chamfered portion being located at a radially outer corner of the second bent portion at which a side surface of the second bent portion on the side being circumferentially bent intersects with a side surface of the second bent portion on the radially outer side, the second R-chamfered portion being formed of a curved surface having a curvature radius larger than a curvature radius of the other three corners of the second bent portion; wherein each of the electrical conductors includes a conductor portion and an insulating film covering the conductor portion, the first R-chamfered portion being formed by making a thickness of the insulating film at the inner corner of the first bent portion smaller than at the other three corners of the first bent portion, the second R-chamfered portion being formed by making a thickness of the insulating film at the outer corner of the second bent portion smaller than at the other three corners of the second bent portion.

* * * * *